Feb. 7, 1950
JEAN THÉODORE FOUFOUNIS,
ALIAS JEAN MICHEL PAILLAIS
2,496,405
DEVICE FOR MEASURING THE DEGREE OF ADHESION
OF VEHICLE WHEELS TO THEIR TRACKS
Filed March 25, 1946
2 Sheets-Sheet 1
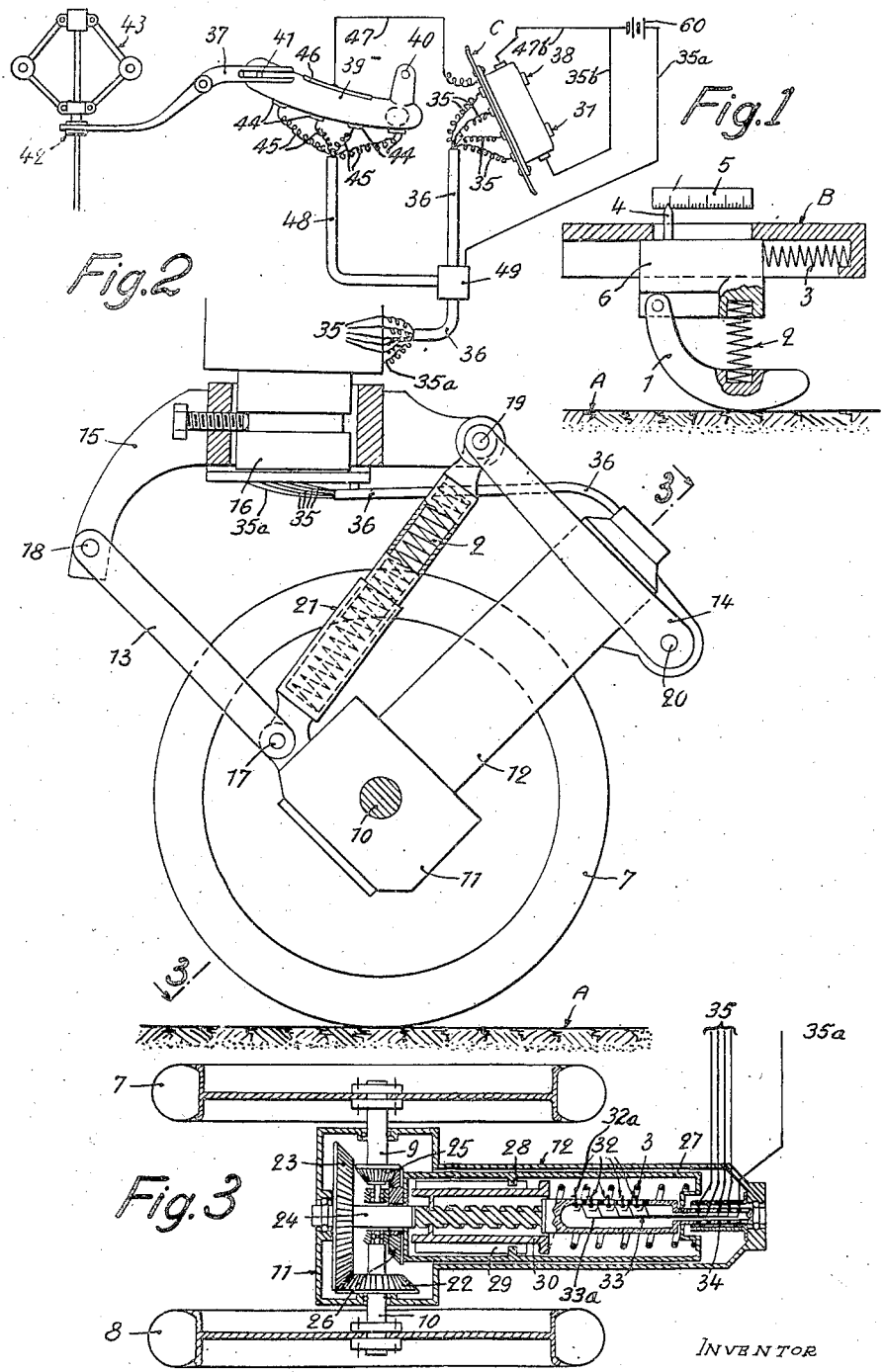
INVENTOR
JEAN THEODORE FOUFOUNIS
ALIAS, JEAN MICHEL PAILLAIS
By Benedict & Swartwood
ATTORNEYS

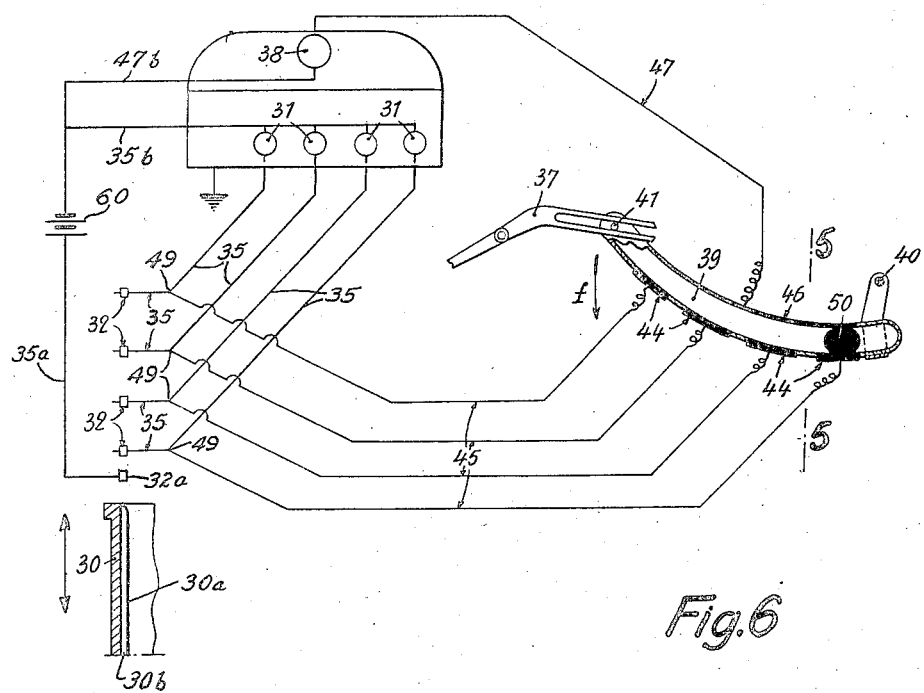
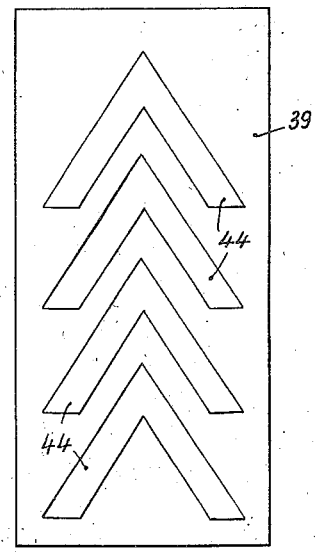
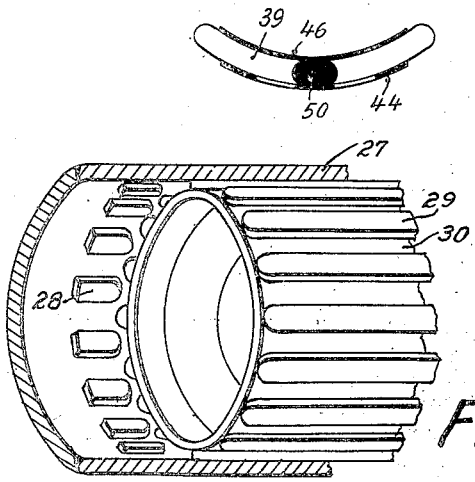

Patented Feb. 7, 1950

2,496,405

UNITED STATES PATENT OFFICE 2,496,405

DEVICE FOR MEASURING THE DEGREE OF ADHESION OF VEHICLE WHEELS TO THEIR TRACKS

Jean Théodore Foufounis, alias Jean Michel Paillais, Paris, France

Application March 25, 1946, Serial No. 657,000
In France January 5, 1945

Section 1, Public Law 690, August 8, 1946
Patent expires January 5, 1965

9 Claims. (Cl. 73—9)

The invention has for its object to provide a device adapted to measure or to indicate the degree of adhesion of the wheels of a vehicle to the road, a railway track, etc. . . . i. e. the friction coefficient of the latter.

The device essentially comprises an adhesion feeling member yieldingly urged toward the surface over which the vehicle travels and a dynamometric device for measuring the frictional resistance which tends to oppose movement of said member along with the vehicle, i. e., the frictional lag of said member with respect to the vehicle.

According to an embodiment of the invention, the feeling member may consist of a skid urged toward the ground by a spring and supported by a carriage movable with respect to the vehicle to which it is connected by an antagonistic spring, the amplitude of the displacements of the carriage relatively to the vehicle giving a measurement of the friction coefficient of the road or the like.

According to a modification of the invention, the feeling member comprises two coaxial feeling wheels or casters, adapted to cause rotation of a screw and a cooperating nut, respectively, through the medium of transmission gears of different ratios, movement of the nut along the screw being opposed by a spring and giving a measurement of the friction coefficient of the road or the like.

Preferably, the measurements effected by the device will be translated on the dashboard of the vehicle by putting "on" or "off" one or several signal lamps, adapted to draw the driver's attention when the road becomes dangerously slippery.

It should however be noted that the danger involved on a slippery road section is greater as the vehicle speed increases, and the absolute measurement of the friction coefficient should be integrated with a speed measurement.

For this purpose, and according to another feature of the invention, the device comprises a speed measuring device whose operation is associated with that of the adhesion measuring device, in order to integrate both indications and control a signal accordingly.

For example, the signal may consist of one or several special lamps, adapted to be put "on" or "off" when, at a given vehicle speed, the road-vehicle adhesion falls below a certain limit, or, on a road section of a given friction coefficient, the vehicle speed exceeds a certain limit.

According to a preferred embodiment of the invention, said lamp may be mounted in a circuit comprising a mercury switch embodying a tube, the inclination of which may be altered under the action of a speed indicating device, and provided with a number of electrically conducting portions adapted to be energized through respective contacts, under the selective action of a movable contact responsive to the adhesion variations as measured by the adhesion meter.

It will be appreciated that the danger involved by driving on a slippery road section increases in a descending slope and decreases in an ascending slope. This may be very simply taken in consideration by disposing the longitudinal axis of the mercury switch in parallel relation with the longitudinal axis of the vehicle. The switch will thus operate as a level, and at the same time the mass of mercury will be responsive to the vehicle accelerations and decelerations; the importance of this factor on the stability of a vehicle on a slippery road is also well known.

The danger of driving on a slippery road increases as the convex curvature of the cross-section of the road increases, and the information given to the driver will be much more valuable if the signalling instrument takes this factor in consideration.

For this purpose, and according to a further feature of the invention, the speed measuring and adhesion measuring devices are preferably associated with a transverse levelling instrument in such a manner that the latter cooperates in the control of the signal, whereby the latter will integrate adhesion, vehicle speed, road convexity and slope measurements.

According to a preferred embodiment of the invention, such a transverse level may be readily provided by devising a transversely curved mercury switch, the electrically conducting portions thereof having a chevron-like shape. In such case, the mass or drop of mercury is subjected to centrifugal force when the vehicle departs from a straight course, whereby the signal will be sensitive to such deviations from the straight line. The importance of slowing down on sinuous slippery roads is well known. When the road profile is correctly inclined in a turning, the stability of the vehicle is improved and the device according to the invention gives a more optimistic information, as the mercury drop assumes a position of equilibrium under the antagonistic effects of gravity and centrifugal force.

Further features of the invention will be set forth in the following description, with reference to the accompanying drawing, given solely by example and in which:

Fig. 1 is a diagrammatic showing of an adhesion measuring device embodying a friction skid.

Fig. 2 is a diagrammatic showing of an adhesion meter embodying a pair of casters or friction wheels.

Fig. 3 is a section along line 3—3 of Fig. 2.

Fig. 4 is an enlarged sectional view of a mercury switch controlling signal lamps mounted on the dashboard.

Fig. 5 is a transverse section of line 5—5 of Fig. 4.

Fig. 6 is a developed plan view of the electrically contacting sections of said switch.

Fig. 7 is an enlarged detail perspective view, partly in section, of certain parts shown in Fig. 3.

Referring to Fig. 1, reference numeral 1 denotes an adhesion feeler, yieldingly urged by a spring 2 toward the surface or track A on which the vehicle moves. B diagrammatically shows a portion of the vehicle undercarriage and 3 a dynamometric device, such as a spring, for measuring, by means of an index 4 and a graduated scale 5, the friction force which causes lag of the feeler with respect to the underframe. In this embodiment of the invention, feeler 1 consists of a skid pivoted to a movable carriage 6, guided in member B, spring 2 being interposed between skid 1 and carriage 6 and spring 3 between carriage 6 and member B.

In the embodiment of Figs. 2 and 3, the feeler consists of a pair of coaxial coasters or friction wheels 7 and 8, preferably fitted with solid tires in order that the degree of inflation should not interfere with the adhesion measurements. The spindles 9 and 10 of said wheels are mounted in a casing 11, extended by a tube 12, which forms one side of a deformable parallelogram, the other sides of which are constituted by two links 13 and 14 and by a rotary lever 15, adapted to pivot about a vertical spindle 16, secured to the vehicle underframe, the pivotal connections between the sides of the parallelogram being shown at 17, 18, 19 and 20. Spring 2, which is adapted to urge the wheels toward the ground A, is preferably enclosed in a telescopic tube 21, pivoted about the axes 17 and 19.

The spindle 10 of one wheel 8 carries a bevel gear 22, meshing with a bevel gear 23, keyed to a screw 24, so mounted as to rotate about the axis of the tube 12. The spindle 9 of the other wheel 7 carries a bevel gear 25 in mesh with a bevel gear 26, coaxial with gear 23, and secured to one end of a rotary sleeve 27, having internal teeth 28 engaging flutes 29 cut in a nut 30, engaging screw 24. The dynamometric spring 3 above indicated is interposed between nut 30 and the other end of sleeve 27.

Teeth 28 and flutes 29 are illustrated in detail in Figure 7.

A raising and lowering apparatus, not shown, may be provided to allow the operator of the vehicle to put at will the entire adhesion measuring device in operative or idling positions. Such an apparatus may be of any conventional type, and, for instance, may be adapted to raise or lower spindle 16, within the vehicle underframe, to the extent required to break or establish contact of the wheels 7 and 8 with their track.

The operation is as follows:

As the vehicle moves, both friction wheels 7 and 8 tend to be driven in rotation at the same speed by reason of the adhesion to the ground A. The transmission ratios between the sets of gears 22, 23 and 25, 26 being different, the screw and nut assume different angular speeds, whereby nut 30 moves along the screw against the action of spring 3. At a given instant, a balance is reached and the relative movement of the screw and nut is stopped, one of the friction wheels slipping on the ground. It is evident that such slipping motion, which corresponds to the position of equilibrium of the nut, will take place for a tension of the spring which is smaller as the adhesion of the friction wheels to the ground is smaller. Hence, the stroke of nut 30 along screw 24 will measure the degree of adhesion offered by the road, exactly as the lag of skid 1 in Fig. 1.

This relative movement of the nut and screw may be transmitted to the dashboard through a Bowden cable or pneumatic, hydraulic or like connection. In the example herein illustrated, it is electrically transmitted to a set of signal lamps 31 (see Fig. 4) mounted on the dashboard and adapted to be put "on" or "off" successively, according to the degree of adhesion.

For this purpose, and as illustrated in the embodiment of my invention shown in Figures 3 and 4, screw 24 may carry a series of contacts 32 and a single contact 32a; these contacts are so disposed that as nut 30 moves along the screw 24, nut 30 depresses first the single contact 32a, then successively the various contacts 32, four of these being illustrated in the drawings in Figures 3 and 4. Thus, nut 30 closes the current between the single lead 32a and the various successive leads 32; for this purpose it may comprise, as shown in Figure 4, an inner annular current conducting lining 30a insulated from the body of nut 30 by a dielectric 30b. A collector 34, rotatable with screw 24, carries contact bands corresponding to each of contacts 32 and 32a, with which they are connected by individual wires 33 and 33a, respectively. The current is collected from the bands of collector 34 by brushes connected respectively with wires 35, coresponding with contacts 32 and wires 33, and wire 35a corresponding with contact 32a and wire 33a. As illustrated in Figures 2, 3 and 4, wires 35 lead to lamps 31, while wire 35a, serving together with contact 32a and wire 33a as return wire, connects with one terminal of a conventional current source 60, the other terminal of which is connected to lamps 31 by a wire 35b. For simplification, wires 33 and 33a are not identified separately in Figure 4, as they merely serve to connect wires 35 and 35a with contacts 32 and 32a, respectively.

Since the internal surface of nut 30 is conductive, when said nut 30 moves from the left to the right (according to Fig. 3) or from the bottom of the top (according to Fig. 4), the circuits of lamp 31 close one after the other, through contact 32a and the successive contacts 32, their leads through lamps 31, current source 60 and the described interconnecting wires. Wires 35a and 35 may form a cable 36, as shown on Fig. 2, leading from tube 12 to a connection box 49, and to lamps 31, either directly or through brushes and collectors associated with the vertical spindle 16, as shown, in order to take account of the rotation of lever 15 when the vehicle departs from the straight course.

When the adhesion is small, the stroke of nut 30 is reduced, all the contacts 32 are open and the lamps 31 are off. If the adhesion increases, the lower-most contact 32 (Fig. 4), which corresponds to left-hand contact 32 of Fig. 3, is closed, thus energizing the right-hand lamp 31. As the adhesion increases, the second, third and fourth lamps are successively on. When the adhesion exceeds a certain limit, the flutes 29 escape the internal teeth 28 and the device becomes idle and is thus relieved from undue wear. This is illustrated in Fig. 7, where nut 30 is shown in the position which it occupies when the adhesion is sufficient to cause this nut to compress fully spring 3; namely, by reference to Fig. 3, when nut 30 has moved as far as it can to the right. The device is so designed by proper location of teeth 28 that at such a position of nut 30, flutes 29 escape teeth 28, and nut 30 no longer rotates with sleeve 27; but spring 3 simultaneously pushes nut 30 back toward teeth 28 (leftward in Figs. 3 and 7). Under these conditions, nut 30, subjected to the two contrary forces of spring 3 and of teeth 28, reaches such an equilibrium position that the ends of flutes 29 slide over the ends of teeth 28, and nut 30 is no longer meshed to sleeve 27.

As soon as the adhesion becomes less than that at which this disengagement of flutes 29 from teeth 28 has occurred, the action of spring 3 prevails, flutes 29 mesh again with teeth 28 and remain geared therewith.

In the operation so far described, danger by low adhesion is called to the attention of the driver by the extinction of the lamps 31, which are lighted when adhesion increases. If desired, the device may be so modified, by suitable and apparent rearrangement of contacts 32 and 32a, that all lamps 31 are lighted on low adhesion, and that they are turned off upon increasing adhesion; danger due to decreasing adhesion is then called to the driver's attention by the lighting of the lamps. For this alternative, for instance, contacts 32 and 32a are opened by depression as nut 30 moves along its stroke (rightward in Fig. 3) and the relative position of contacts 32 and contact 32a along the stroke of 30 is inverse from that shown in the drawings.

In order to take care of the influence of the vehicle speed upon the stability, the device may comprise a speed indicator 37 (Fig. 4), the operation of which is associated with that of the adhesion feeeler 7, 8, 30, so as to control a signal integrating the adhesion and speed measurements, for example a lamp 38 which is put off when the speed exceeds a certain limit for a given adhesion, or when the adhesion falls below a certain limit at a given speed.

In the embodiment herein represented (Figs. 2 and 4), lamp 38 is mounted in a circuit including a mercury switch 39, consisting of a tube of variable inclination, pivoted about an axis 40 under the action of the speed indicator 37, the latter comprising a fork engaging pins 41 mounted on the tube and actuated by the sleeve 42 of a centrifugal regulator 43. Tube 39 is provided with lower electrically conducting sections 44, connected with contacts 32 and lamps 31 by wires 45, and an upper electrically conducting section 46, connected by a wire 47 with lamp 38. The circuit of lamp 38 is completed by wire 47b, leading to that terminal of source 60 to which wire 35b is also connected.

In Fig. 2, wires 45 form a cable 48, connected with cable 36 by a connection box 49.

The speed indicator is so designed that once the vehicle is in motion, lamp 38 is turned on whenever speed and adhesion are so correlated that the speed of the vehicle is within safety limits, and that upon motion of the vehicle either the failure of lamp 38 to light or, once lamp 38 is lighted, its subsequent extinction, indicates that the speed and adhesion are such that the stability of the vehicle is not safe. In Fig. 4, it has been assumed that the vehicle moves very slowly, whereby the left-hand portion of tube 39 is raised to a maximum, and that the adhesion of the road is very low, whereby all the contacts 32 are open, the circuits through lamp 38 are therefore open, and lamp 38 is off, which indicates danger. As soon as the adherence of the road increases, the lowermost contact 32 (Fig. 4) closes through the action of the adhesion feeler 7, 8, 30, and the corresponding circuit through lamp 38 closes also, through the closed contact 32 and through the droplet 50 in tube 39, which droplet makes contact between the lowermost right-hand conducting section 44 and the upper conducting section 46 of tube 39 as shown in Fig. 4. Lamp 38 being "on," the driver may safely accelerate the speed of the vehicle. As the speed increases, the speed-indicator 37 is rotated and tube 39 pivots in the direction of the arrow f. The mercury drop 50 leaves contact with the right-hand conducting section 44 and reaches the second one from the right. If the adhesion is such that the lowermost contact 32 is then closed, with the exception of the others, the circuit of lamp 38 is again open and the lamp is put "off," thus informing the driver that the situation is again unsafe, and so on. This is brought about by the fact that, as shown in Fig. 4, the only contact 32 through which the circuit is closed is the lowermost one; while the droplet 50, which would close the circuit through lamp 38 and light the latter if it were at that time over the right-hand conducting section 44 of tube 39, is, however, at this moment over the second section 44 from the right which is then connected to an open contact 32; thus the circuit through lamp 38 is open under those conditions and lamp 38 is off. On the other hand, if the vehicle is operating at low speed over a road of high adherence, then all lamps 31 are lighted, as all contacts 32 are closed through the maximum displacement of the adhesion feeler towards the right in Fig. 2, or towards the top in Fig. 4. The driver can then accelerate his speed, and this acceleration moves tube 39, through the action of the speed indicator 43, so as to cause the droplet 50 to pass from right to left in tube 39 (Fig. 4), successively closing contacts 44—46 from right to left until the left-hand contact 44—46 is established, each time lighting lamp 38 through closed contacts 32; when the left-hand contact 44—46 is established, with a corresponding lighting of lamp 38, the driver will know that he has reached top speed for the high adherence then prevailing.

Safe driving is indicated when the speed is such that the slope of tube 39 brings the droplet 50 over that conducting plate 44 which is connected to the highest one (in Fig. 4) of such of the contacts 32 as are closed, thus showing that speed and adherence are properly related.

Whenever the speed is increased beyond the safe value for a given adherence, lamp 38 will go off and will only be put on again if the speed is decreased or the adherence increased.

Tube 39, whose axis is parallel with the vehicle axis, operates as a longitudinal level, which automatically integrates the factor "road declivity" in the operation.

Accelerations and decelerations of the vehicle are simultaneously taken into account, due to the inertia of the mercury drop.

In order to also take in consideration the convex profile of the road in cross-section, there may be associated with the foregoing devices a transverse level, which may be advantageously constituted by tube 39 itself, which, for this purpose, has a curved cross-section (Fig. 5). Moreover, the conducting sections 44 are shaped as interfitting chevrons or V's (Fig. 6).

When the road is flat, the mercury drop 50 lies in the axis of the tube at the apex of a chevron, corresponding to the lighting of lamp 38. When the road has a convex profile, the mercury drop moves laterally, thus putting off lamp 38, if the chevron wing with which it makes contact is not energized, due to an insufficient adhesion of the road.

The same operation takes place when the vehicle is turning, under the effect of centrifugal force.

It will be seen that the device according to the invention thus integrates by relatively simple means the various factors which influence the stability of a vehicle on a slippery road, viz.:

(1) The coefficient of adhesion of the road,
(2) The convex transverse profile of the road,
(3) The longitudinal profile of said road,
(4) The vehicle speed,
(5) The accelerations and decelerations of the vehicle,
(6) The effect of turning,
(7) The state of the tires, by a preliminary adjustment of the tension of spring 2 in proportion to the degree of wear of the tire.

Obviously, the invention is not limited to the embodiments above described, which have been given solely by way of example.

Having now described my invention, what I claim as new and desire to secure by Letters Patent is:

1. A device for indicating the adhesion of vehicle wheels to the surface over which said wheels travel comprising a frame rotatably mounted about a vertical axis and adapted to be drawn by a vehicle, a pair of coaxial feeling wheels carried by said frame and adapted to yieldingly engage said surface, elastic means adapted to yieldingly urge said feeling wheels toward said surface, dynamometric means adapted to respond to the frictional drag of said feeling wheels and to indicate said frictional drag, said dynamometric means including a rotary screw and a rotary nut cooperating with said screw and adapted to selectively engage said screw in response to said frictional drag, first rotation transmitting means connecting said screw and one of said feeling wheels, second rotation transmitting means connecting said nut and the other of said feeling wheels, the relation of the transmission ratios between said screw and its connected feeling wheel on the one hand and between said nut and its connected feeling wheel on the other hand being such that equal angular rotations of said feeling wheels cause unequal angular rotations of said screw and of said nut and a corresponding elastic deformation of said dynamometric means.

2. In a device as claimed in claim 1, a sleeve coaxial with and surrounding said nut and interposed between said nut and its corresponding feeling wheel, said sleeve being rotatable with said feeling wheel and slidably engaging said nut, teeth disposed on the inner surface of said sleeve, flutes disposed on the outer surface of said nut, said flutes engaging slidably between said teeth and being constructed and arranged to escape said teeth at a predetermined deformation of said dynamometric means, thereby disconnecting said nut from its said corresponding feeling wheel.

3. A device for indicating unsafe driving condition of a surface over which a vehicle travels comprising, a feeler rotatably mounted about a vertical axis and adapted to be drawn by a vehicle and to yieldingly engage said surface, dynamometric means adapted to respond to the frictional drag of said feeler, said dynamometric means including relatively movable cooperating contact members adapted to selectively engage each other in response to said frictional drag, a pivotally mounted mercury switch having spaced electrical conducting portions, speed responsive means connected to said mercury switch for adjusting same about its pivot in accordance with the speed of the vehicle to which the device may be attached, an electric circuit including a source of potential, an electrical lamp and said electrical conducting portions and controlled by said contact members whereby the lighting and extinction of said lamp is controlled by the speed, acceleration and the frictional drag of said feeler.

4. A device as claimed in claim 3 in which the longitudinal axis of said mercury switch is substantially parallel with the longitudinal axis of said vehicle.

5. A device as claimed in claim 3 in which said mercury switch is transversely curved.

6. A device as claimed in claim 3 in which said mercury switch is longitudinally curved.

7. A device as claimed in claim 3 in which said spaced electrical conducting portions have the form of V-shaped chevrons.

8. A device for measuring the adhesion of vehicle wheels to the surface over which said wheels travel, comprising a deformable parallelogram adapted to be drawn by a vehicle and having a first side rotatably mounted on said vehicle about a vertical axis, a pair of coaxial feeling wheels carried by a second side of said parallelogram opposite said first side, elastic means connecting opposite apices of said parallelogram and adapted to yieldingly engage said feeling wheels onto said surface, a casing associated with said feeling wheels and with said second side of said parallelogram, said casing enclosing dynamometric means, said dynamometric means including a rotary screw and a rotary nut cooperating with said screw and adapted to selectively engage said screw in response to said frictional drag, first rotation transmitting means connecting said screw and one of said feeling wheels, second rotation transmitting means connecting said nut and the other of said feeling wheels, the relation of the transmission ratios between said screw and its connected feeling wheel on the one hand and between said nut and its connected feeling wheel on the other hand being such that equal angular rotations of said feeling wheels cause unequal angular rotations of said screw and of said nut and a corresponding elastic deformation of said dynamometric means, said dynamometric means being adapted to oppose said unequal rotations of said screw and nut.

9. A device as claimed in claim 8 further comprising a circular sleeve connected with said casing and interposed between said casing and said nut, said sleeve being positively connected with said rotation transmitting means connected with said nut; and a groove and pin locking connection between said sleeve and said nut, the length of said locking connection being less than the maximum axial stroke of said nut along said screw, said locking connection being adapted to lock said sleeve and nut in rotation and to disconnect said nut from its associated feeling wheel when said nut engages said screw beyond a predetermined length of axial stroke of said nut along said screw.

JEAN THÉODORE FOUFOUNIS, alias
JEAN MICHEL PAILLAIS.

REFERENCES CITED

The following references are of record in the file of this patent:

UNITED STATES PATENTS

| Number | Name | Date |
|---|---|---|
| 2,225,140 | Walker | Dec. 17, 1940 |
| 2,290,618 | Bosomworth | July 21, 1942 |